United States Patent

Sasao et al.

[11] Patent Number: 5,847,874
[45] Date of Patent: *Dec. 8, 1998

[54] CONTROL APPARATUS FOR POSITIONAL CONTROL OF AN OPTICAL SYSTEM

[75] Inventors: Takayoshi Sasao, Zushi; Fumio Ogasawara, Yokohama; Satoru Yokoi, Yokosuka, all of Japan

[73] Assignee: Victor Company of Japan, Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 638,547

[22] Filed: Apr. 26, 1996

[30] Foreign Application Priority Data

Apr. 28, 1995 [JP] Japan ................................. 7-129530

[51] Int. Cl.⁶ ............................ G02B 27/64; G03B 17/00
[52] U.S. Cl. ............................ 359/554; 396/52; 396/55
[58] Field of Search ..................... 359/696–697, 359/823–824, 554; 396/85–87, 89, 133, 52, 55; 250/201.2, 203.3

[56] References Cited

U.S. PATENT DOCUMENTS

| | | |
|---|---|---|
| 4,841,325 | 6/1989 | Hoshino et al. ................ 354/402 |
| 5,225,941 | 7/1993 | Saito et al. ................ 359/824 |
| 5,335,032 | 8/1994 | Onuki et al. ................ 396/50 |
| 5,365,296 | 11/1994 | Murakami et al. ................ 354/195.1 |
| 5,438,190 | 8/1995 | Kaneda et al. ................ 250/201.3 |
| 5,471,296 | 11/1995 | Parker et al. ................ 356/139.06 |

FOREIGN PATENT DOCUMENTS 6-201974  7/1994  Japan .
6-201975  7/1994  Japan .

*Primary Examiner*—Georgia Y. Epps
*Assistant Examiner*—Jordan M. Schwartz
*Attorney, Agent, or Firm*—Michael N. Meller

[57] ABSTRACT

A control apparatus for controlling quickly and correctly, positions of a group of zoom lenses and a group of focus lenses without being subjected to an attitude of a camera. The control apparatus has a group of zoom lenses, a group of focus lenses, actuators for mechanically driving the group of zoom lenses and the group of focus lenses, drive circuits for driving the actuators, and a position detecting devices for detecting each of the present positions of the group of zoom lenses and focus lenses. The apparatus also includes a target position calculating device for calculating a target position for each group of lenses, a positioning device for respectively positioning the groups of the lenses at their target positions, an evaluation device for evaluating the results of the positioning of the focus group and the zoom group of lenses, and a correction device for outputting corrected values for canceling errors caused by the effect of gravity by referring to the output of the positioning device and that of the evaluation device.

12 Claims, 7 Drawing Sheets

CONTROL APPARATUS FOR POSITIONAL CONTROL OF AN OPTICAL SYSTEM

BACKGROUND OF THE INVENTION

1. Field of the Invention

The present invention relates to a control apparatus for controlling an optical system having a group of zoom lenses and a group of focus lenses, and more particularly to a control apparatus for positionally controlling optical system which is stable against an attitude change of optical system and responds quickly and precisely to an operating command.

2. Description of the Related Arts

Generally, a step motor had been utilized as a driving device for controlling an optical system such as that of a video camera.

In recent years, since precise and quick response is required for controlling an optical system of a video camera, a progress is made in a control apparatus for controlling an optical system. For instance, a voice coil motor for driving a optical system is utilized for producing a downsized and lightweighted camera.

FIG. 1 is a perspective view for explaining an ordinary control apparatus for controlling optical system in a prior art.

Referring to FIG. 1, a description is given of the ordinary control apparatus using a voice coil motor in the prior art, taking an example which is composed of a group of lenses 31, a supporting frame 32 supporting the group of lenses 31, a driving coil 33 wound around the supporting frame 32, a guide shaft 34 allowing a slide movement of the supporting frame 32, a yoke 36, a housing 37 holding a magnet 35 and the yoke 36, and a position detector 38 detecting a position of the supporting frame 32.

The supporting frame 32 is supported by a pair of guide shafts 34 which are provided parallel each other, and is allowed to slide thereon in the direction of optical axis of the group of lenses 31. The supporting frame 32 and the group of lenses 31 are driven in the direction of the optical axis by supplying an electric current to the driving coil 33.

For a position detector 38, it is conceivable to use a contact type such as a linearly sliding variable resistor, or a non-contact type sensor such as a combination of a magnet and a magneto-resistance element, or a combination of a light emitting element and a photo sensor.

FIG. 2 shows a block diagram of a control apparatus for controlling an optical system in the prior art.

Referring to the FIG. 2, the control apparatus is composed of a group of zoom lenses 4 adjusting a magnification of the optical system, a group of focus lenses 6 focusing the optical system, actuators 7 and 9 driving the groups of zoom lenses 4 and focus lenses 6 respectively, driving circuits 10 and 12 driving the actuators 7 and 9 respectively, lens position detecting devices 1 and 3 detecting positions of the groups of zoom lenses 4 and focus lenses 6, a diaphragm 5, a diaphragm actuator 8, a diaphragm driving circuit 11 driving the diaphragm actuator 8, and an aperture detecting device 2 detecting an aperture of the diaphragm 5. An imaging device 13 is disposed on an optical axis which is common to the groups of zoom lenses 4 and focus lenses 6, and the diaphragm 5. An image signal processing circuit 14 outputs an image signal.

The image signal from the image signal processing circuit 14, and position signals from the lens position detecting devices 1 and 3, and an aperture signal from the aperture detecting device 2 are all supplied to a control signal producing circuit 15, in which a target position calculating device 16 calculates target positions of the groups of zoom lenses 4 and focus lenses 6 using the image information derived by the image signal processing circuit 14, or calculates the target positions from a focus distance information generated as a result of operator's manipulation of the group of zoom lenses 4 and/or the group of focus lenses 6. A position control device 17 positions each groups of lenses 4 and 6 according to the position data which are calculated by the target position calculating device 16.

FIG. 3 shows an example of lens position control network composed of the control signal producing circuit 15, the driving circuits 10, 12, the actuators 7, 9, and the lens position detecting devices 1, 3, for positioning the groups of lenses 4 and 6 to their respective target positions. The control signal producing circuit 15 includes a subtracter 39 and a phase compensator 40. A position error signal 51 is calculated by and produced from the subtracter 39 from the difference between the target positions of the groups of the lenses 4 and 6 obtained by the target position calculating device 16 and present positions of the groups of lenses 4 and 6 detected by the respective lens position detecting devices 1 and 3. Then, a phase of the position error signal 51 is compensated by a phase compensator 40, and outputted as a drive signal 52. The drive signal 52 drives the actuators 7 and 9 through the driving circuits 10 and 12 respectively and determines each position of the groups of lenses 4 and 6.

As disclosed in the Japanese Patent Laid-Open Publication, 6-201974/1994, there is proposed a driving apparatus for controlling an optical system having preliminary a plurality of compensation devices or a plurality of coefficients of compensation devices and selectively switching them responsive to lens position error signals for quickly controlling the optical system by switching the compensation devices or the coefficients of compensation devices, and for improving the system's stability against a disturbance, such as a vibration or an impact applied to the system.

When a voice coil motor is employed for positioning a lens system, it requires to be powered always to keep a position of the lens system including its supporting frame which are subject to the gravity. And a degree of gravity effect depends on an attitude of video camera.

A problem arises that due to this gravity effect, an actual position of lens system is displaced from its targeted position resulting an out of focus image. In order to compensate this positional displacement, Japanese patent Laid-Open Publication No. 6-201975/1994 discloses the method that the changes of the effect of the gravity, that is, attitude changes of video camera is detected as a change of DC component contained in the control current of their actuators. According to the detection results, phase compensation values are switched, or one of coefficients of phase compensation system is selected for compensating the positional displacement of the lens system.

A control apparatus which utilizes a voice coil motor as a driving means for positioning a group of lenses cannot always position the lenses precisely because the load characteristics of the voice coil motor is usually not linear and lens positioning operation by using the voice coil motor is easily affected by a change of stress developed on the group of lenses and the supporting frame due to a change of attitude of video camera. This leads to produce a poor quality of an image from such optical system, as the target position of the group of lenses and the actual position thereof are caused to be different each other.

SUMMARY OF THE INVENTION

The present invention has been made in order to solve the above-mentioned problem, and an object of this invention is to provide a control apparatus for quickly, precisely and stably controlling a position of an optical system.

The control apparatus of the present invention is comprised of a group of zoom lenses for zooming an object, a group of focus lenses for focusing the object, driving means for driving the groups of the lenses, lens position detecting means for detecting positions of the group of zoom lenses and focus lenses, target position calculating means for calculating positions of the groups of zoom lenses and focus lenses, position control means for properly positioning the groups of zoom lenses and focus lenses, evaluation means for evaluating the results of the above positionings, and correction means for outputting correcting values based on the present positions of the groups of zoom lenses and focus lenses which are obtained from the values of the position control means and that of the evaluation means.

These functions enable to move quickly the positions of the groups of zoom lenses and focus lenses in response to the evaluated values of the respective positions of the groups of lenses when the load applied to the groups of lenses changes due to a tilt of the video camera.

Moreover, the control apparatus of the present invention has memory means memorizing a value outputted from the correction means. The evaluated value is corrected according to the memorized value, and the positions of the groups of lenses are settled precisely even when a load to the lenses changes depending on the attitude of the video camera.

DETAILED DESCRIPTION OF THE PREFERRED EMBODIMENT

Figure 1:
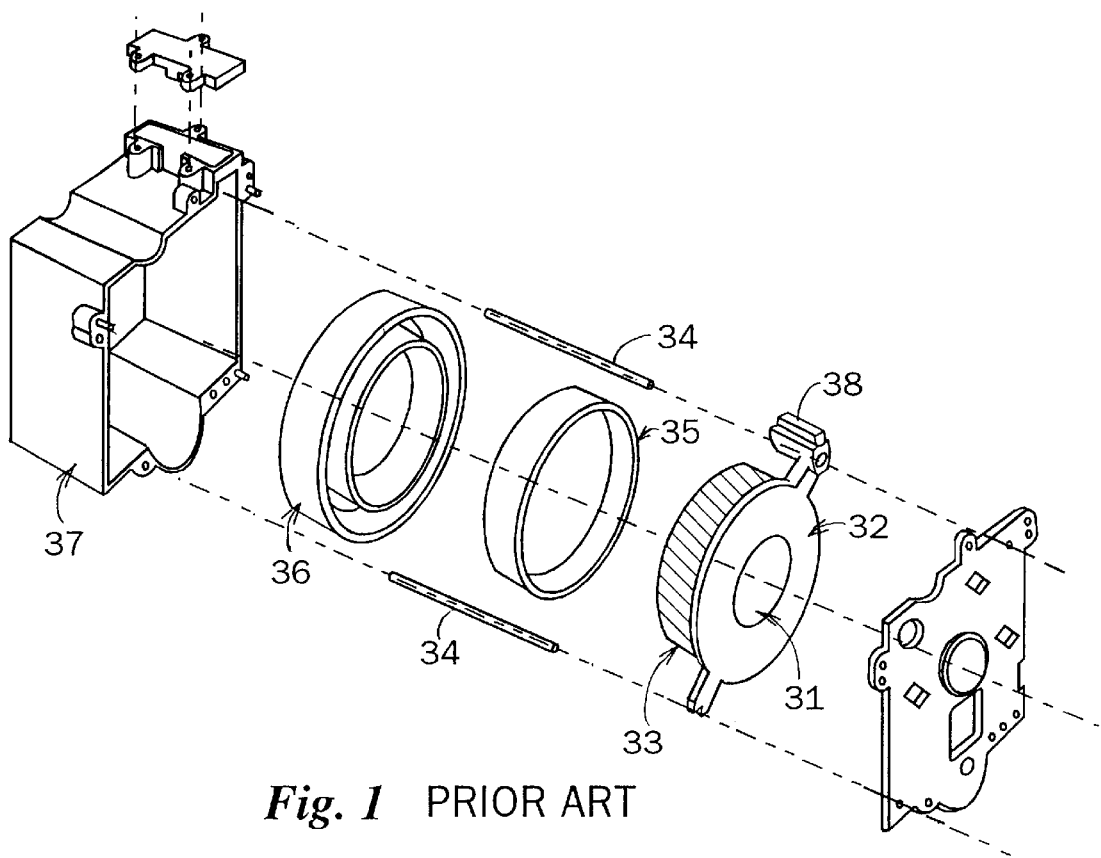
FIG. 1 shows perspective view of a disassembled control apparatus of prior art for controlling an optical system.
Figure 2:
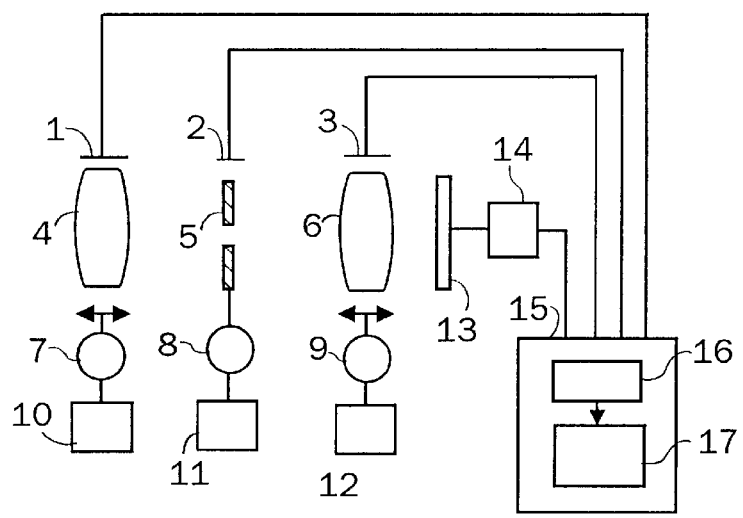
FIG. 2 shows a block diagram of a control apparatus of prior art for controlling an optical system.

The present invention will now be described in detail with respect to the accompanying drawings, in which same reference numerals and symbols are used to denote like or equivalent elements used in the aforementioned prior arts, and detailed explanation of such elements are omitted for simplicity.

First Embodiment

Figure 4:
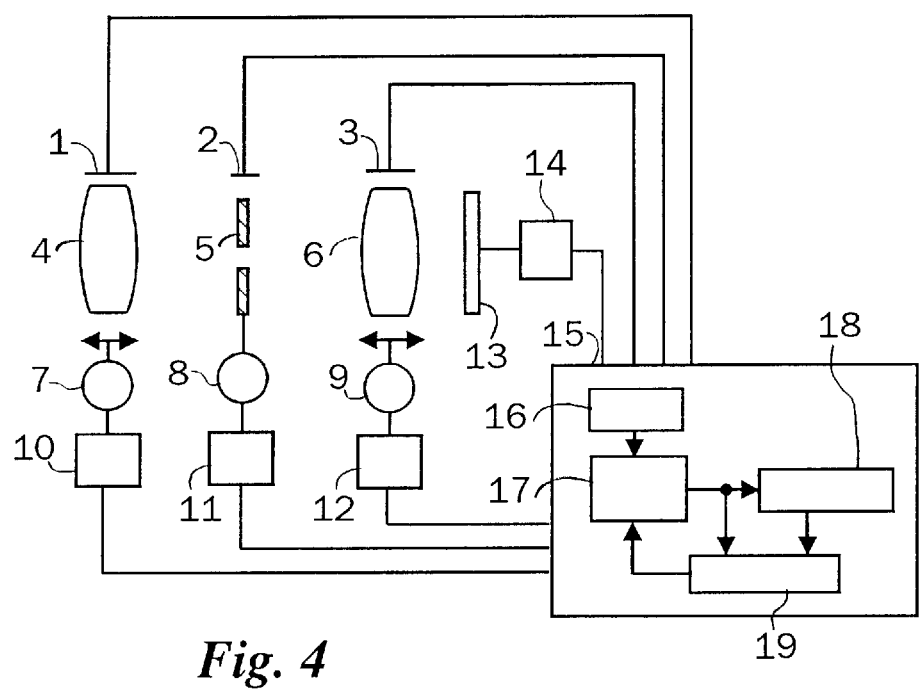
FIG. 4 shows a block diagram of first embodiment of a control apparatus for controlling a position of an optical system of a present invention.

FIG. 4 shows a first embodiment of the present invention.

Referring to FIG. 4, a numeral 4 denotes a group of zoom lenses adjusting a magnification of an object, 6 denotes a group of focus lenses focusing an image, 7 denotes a first actuator moving the group of zoom lenses 4, 9 denotes a second actuator moving the group of focus lenses 6, 10 denotes a first driving circuit driving the first actuator 7, 12 denotes a second driving circuit driving the second actuator 9, 1 denotes a first lens position detector detecting a position of the group of zoom lenses 4, 3 denotes a second lens position detector detecting a position of the group of focus lenses 6, 5 denotes a diaphragm, 8 denotes a third actuator operating the diaphragm 5, 11 denotes a third driving circuit driving the third actuator 8, 2 denotes a position detector detecting an opening of the diaphragm 5, 13 denotes an imaging device positioned on an optical axis common to the groups of the lenses 4, 6 and the diaphragm 5, and 14 denotes an image signal processing circuit outputting an image signal.

A target position calculating device 16 assigns target positions for the group of zoom lenses 4 and the group of focus lenses 6 utilizing the image signal outputted from the image signal processing circuit 14 or utilizing a focus distance information generated as a result of operator's manipulation of the group of zoom lenses 4 and/or the group of focus lenses. The positioning of the group of zoom lenses 4 and the group of focus lenses 6 is determined by a position control device 17, and operating conditions of which is checked by an evaluation device 18. According to an attitude of a video camera (not shown), a correction device 19 outputs a correcting value to be given to the position control device 17 for compensating an effect of the attitude of the video camera, and a corrected result is outputted therefrom.

Figure 6:
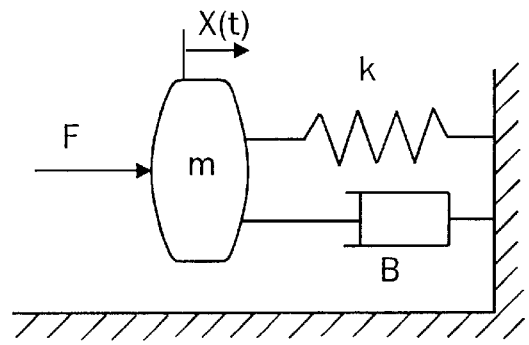
FIG. 6 shows a dynamical model of a voice coil motor.

FIG. 6 shows a dynamic model of a voice coil motor which may be used for the first and second actuator 7 or 9. A character m denotes a movable mass of the group lenses 4 or 6, B denotes viscosity thereof, k denotes a spring rate thereof, x (t) denotes a displacement thereof, and F denotes a driving force of the voice coil motor.

Figure 7:
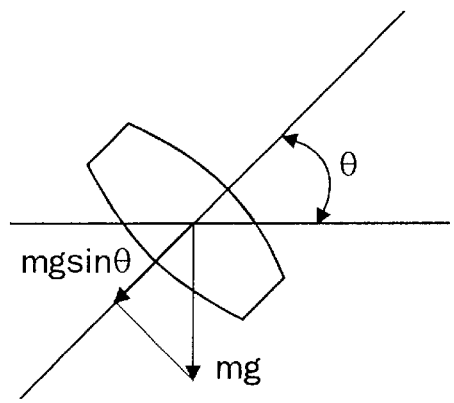
FIG. 7 shows an illustration explaining a sine component of the gravity affecting a group of lenses and a supporting frame therefor, which are driven by a voice coil motor.

FIG. 7 shows a sine component of gravity having a loading effect to the voice coil motor, namely, it is added to mass of the groups of lenses 4 or 6. An equation of motion of this model is given below as Eq (1).

$$m\frac{d^2x(t)}{dt^2} + B\frac{dx(t)}{dt} + kx(t) + mg\sin\theta = Kti(t) = F \quad (1)$$

Eq (1) teaches that driving of the groups of lenses 4 and 6 and the supporting frame 32 without the effect of gravity is possible by cancelling the gravity factor FG=mgsinθ. Kt is a conversion factor converting a driving current i(t) to a driving force F.

Eq (2) shows that the voice coil motor having this characteristics can be controlled independently from the attitude of the optical system i.e. the video camera.

$$m\frac{d^2x(t)}{dt^2} + B\frac{dx(t)}{dt} + kx(t) = F - Fg \quad (2)$$

A method for cancelling the effects of gravity and other disturbance will be explained hereafter.

Figure 8:
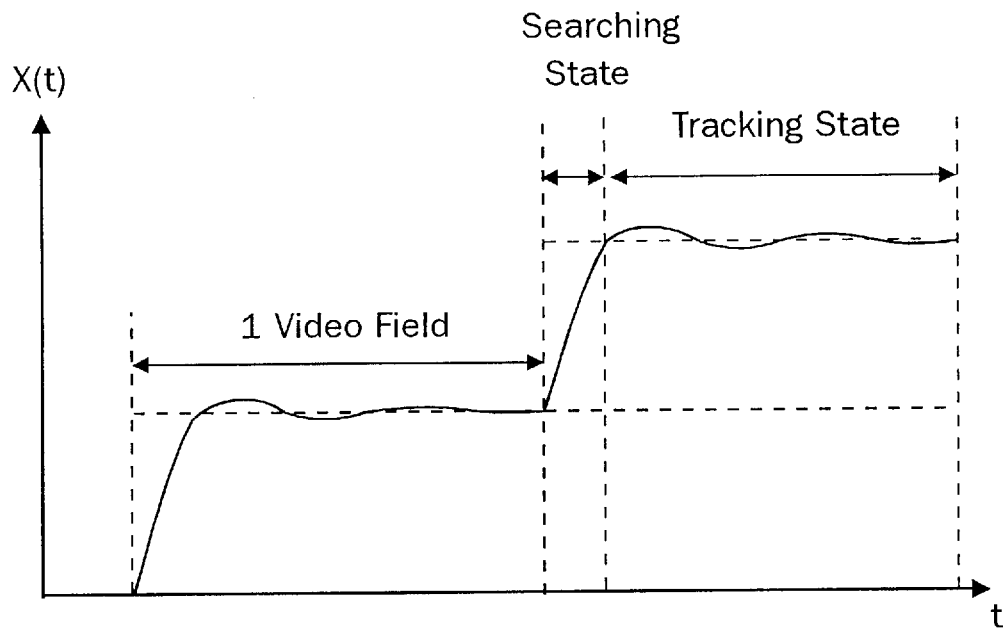
FIG. 8 shows an exemplary response of controlling an optical system.

In FIG. 8, an example of driving operation of a group of lenses 4 and 6 is shown. In every video field, the position control device 17 outputs signals directing the target positions to the actuators 7 or 9. Then, the group of lenses 4 or 6 moves to the directed target position and is settled. It is necessary for the group of lenses 4 or 6 to reach its target position in a short time. After the group of lenses 4 or 6 has reached to the target position, it is also necessary for the group of lenses 4 or 6 to keep tracking its directed positions irrespective of disturbance such as vibration caused to the video camera and the gravity effect which depends on the attitude of the video camera. Thus, the position control device 17 is required to have two contradicting characteristics, i.e., quickness and stability. Two kinds of controlling systems are utilized to satisfy above requirement for the position control device 17.

This kind of system is demanded to eliminate a residual deviation of position i.e. a positional error of the group of lenses, which may develop as a distance between its target position and its actual position. A large amount of proportional gain can minimize this kind of deviation. In a control system for a voice coil motor having a step response represented by the Eq (1), an integral control action capable of theoretically eliminating the deviation is considered.

Figure 3:
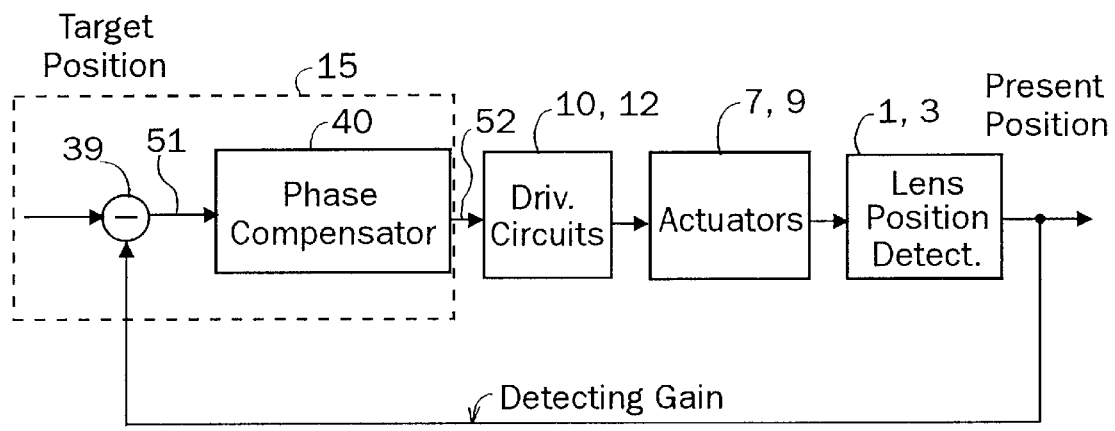
FIG. 3 shows a lens position control network of prior art.
Figure 9:
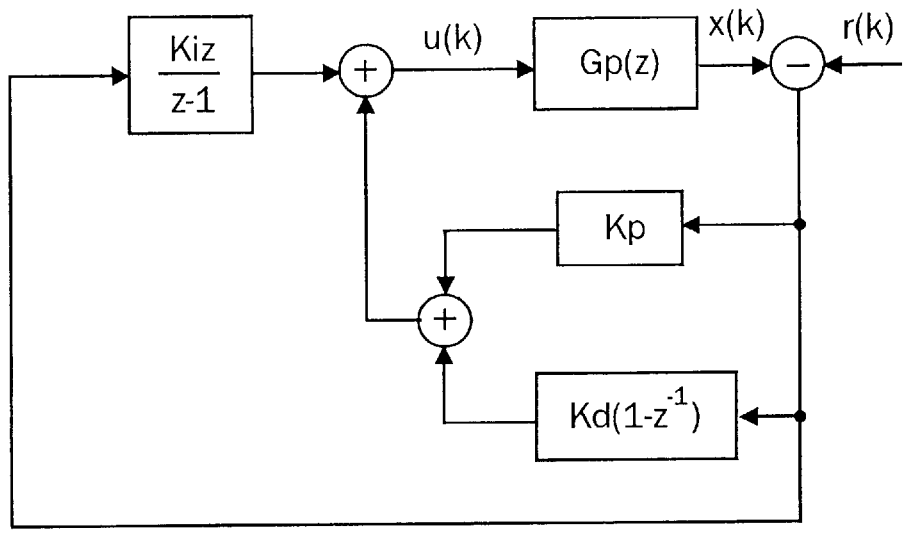
FIG. 9 shows a block diagram of a PID (proportional, integral, and derivative) control system.

FIG. 9 shows a diagram of a PID (proportional, integral, and derivative) control network having an integral control function intended to eliminate the above residual deviation. The network of FIG. 9 corresponds operationally to the diagrams of FIGS. 3 and 4 as follows. A block Gp (z) is a transfer function of the voice coil motor system including the driving circuit 10 (12), actuator 7 (9), and the lens position detecting device 1 (3). A block Kp is a proportional control, function and a block Kd $(1-z^{-1})$ is a derivative control function, a combination of the latter two functions is called PD control system. An integral compensation function $Kiz/z-1$ and the PD control system correspond to the phase compensator 40 in FIG. 3. Ki is a gain of an integral compensator, Kp is a gain of the proportional control section, Kd is a gain of the derivative control section, u (k) is a driving signal for the voice coil motor, x (k) is a displacement of the group of lenses, and r (k) is a target position of the group of lenses. Although the above is a discrete system, a continuous system will give the same result. When the group of lenses is in the target position, an output of the proportional and derivative control is very small. Then, the effect of gravity is compensated by the integral compensating function $Kiz/z-1$ (FIG. 9). Following are practical method of this compensator.

When each group of lenses is moving to each target position, it is difficult to include an integral control action in the control system because the controlling system is required to move the lenses quite quickly and because of a possible unstable operation caused by integrating a large amount of error signal developed upon starting the control. On the other hand, if the proportional and derivative control is intended to be applied as the controlling system upon moving the lenses to their target positions, the controlling system cannot eliminate the effect of gravity, but is subject to an attitude change of such as video camera.

The present invention intends to eliminate the effect of gravity on the load of the voice coil motor at a moment of moving the groups of lenses to their respective target positions by contemplating the lens tracking operation inherent to the video camera i.e. the tracking is performed as such that in every video field, a group of lenses is moved and settled in its targeted position as shown in FIG. 8.

As shown in FIG. 8, there are the moving stage ( a transition period ) and the tracking stage of the groups of lenses in every predetermined field period, i.e. 1-field period of video signal of the video camera. The effect of gravity is compensated by an output of the integral compensator, and this compensation is shown as eq.(2). More precisely, the effect of gravity is compensated by adding the output in the preceding field of the integral compensator. Then, the preceding field is required to be stable. If the output in the preceding field is unstable, such output of the integral compensator cannot be utilized as a control signal in the subsequent field. Namely, the groups of lenses 4 and 6 are required to be settled at the respective target positions in their tracking states in the preceding fields. For monitoring them, the evaluation device 18 is required. The evaluation device 18 evaluates that each of the groups of lenses 4 and 6 is in its tracking state and its residual deviation is within its predetermined value.

As the above is mentioned about control by the integral, proportional and derivative control network, other control system may be capable of presenting a stable control by utilizing a DC output of the system which is outputted a moment before the moving of each of the groups of lenses.

The above mentioned control system may be realized by a computer with software constituting the control signal producing circuit 15 operated as follows.

Figure 13:
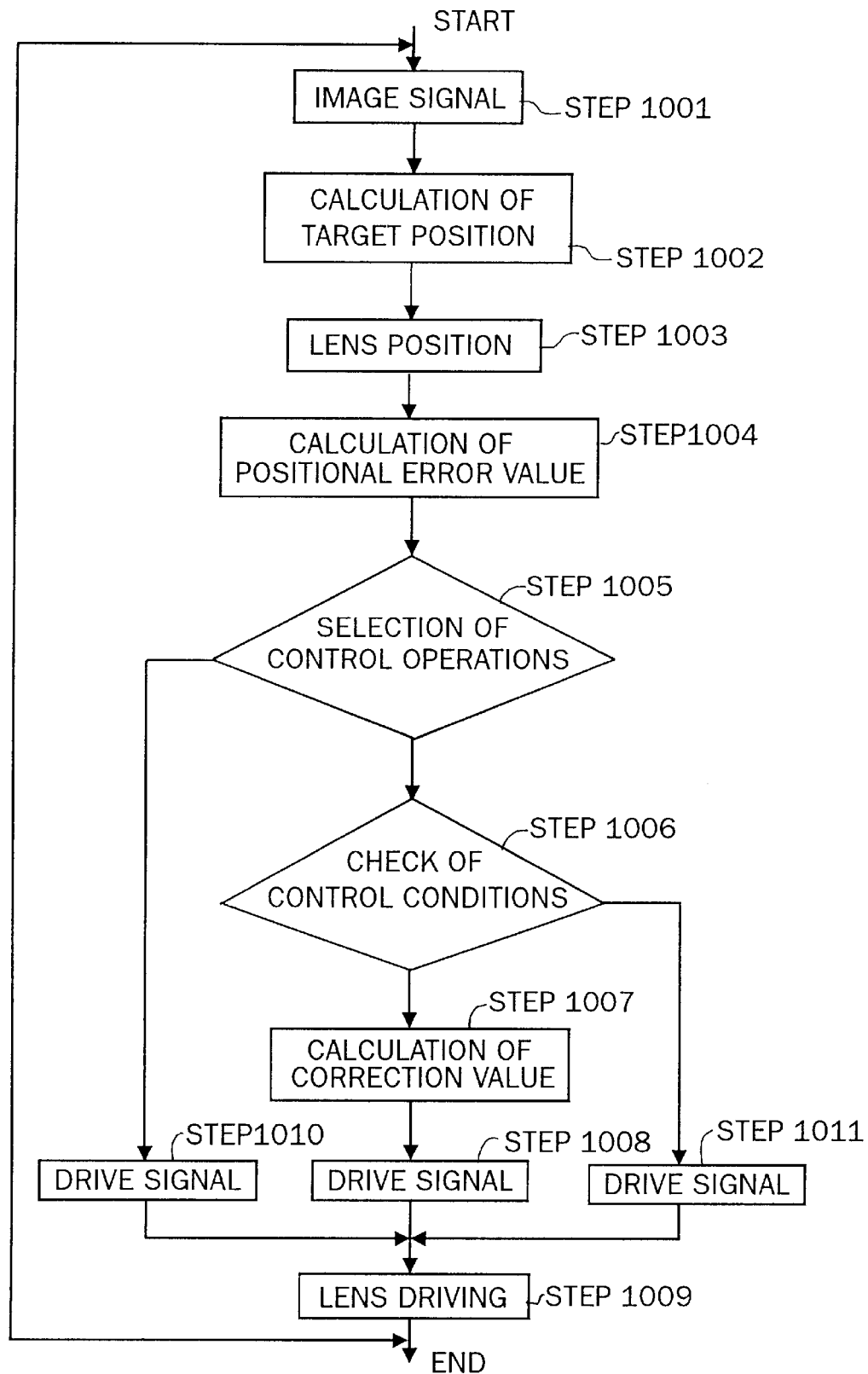
FIG. 13 shows a flowchart of a software which may be used in the first embodiment of the control apparatus for controlling a position of the optical system of the present invention.

A flowchart of the software will be explained referring to FIG. 13.

In Step 1001, the control signal producing circuit 15 receives the image signal from the image signal processing circuit 14.

In Step 1002, the control signal producing circuit 15 calculates and assigns respective target positions for the group of zoom lenses 4 and the group of focus lenses 6.

In Step 1003, the first lens position detector 1 detects the position of the group of zoom lenses 4, and the second position detector 3 detects the position of the group of focus lenses 6.

In Step 1004, the control signal producing circuit 15 calculates respective positional error values of the group of zoom lenses 4 and the group of focus lenses 6 by subtracting the detected results from the values of target positions respectively.

In Step 1005, the control signal producing circuit 15 selects control operations according to the magnitude of the positional errors, such as proportional plus derivative (PD) control operation for a large error, proportional plus integral plus derivative (PID) control operation for a small positional error.

In Step 1006, the control signal producing circuit 15 checks the control condition under which lens positions are controlled before the revision made in Step 1005.

In Step 1007, the control signal producing circuit 15 calculates a correcting value for compensating an effect of the attitude of the video camera.

In response to the actions taken at the preceding steps 1005, 1006, and 1007, the following steps are respectively taken.

In Step 1010, the control signal producing circuit 15 calculates and supplies drive signals to the driving circuits 10 and 12.

In Step 1011, the control signal producing circuit 15 calculates and supplies drive signals to the driving circuits 10 and 12.

In Step 1008, the control signal producing circuit 15 calculates and supplies drive signals to the driving circuits 10 and 12.

In Step 1009, the groups of lenses 4, 6 are driven respectively by signals outputted by the control signal producing circuit 15.

2nd Embodiment

Figure 5:
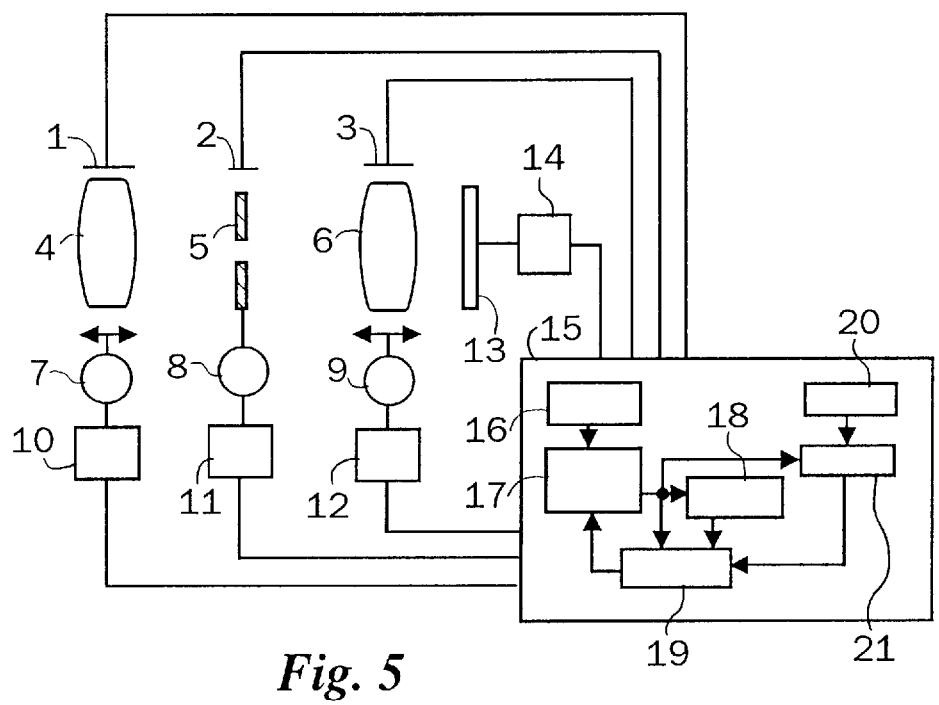
FIG. 5 shows a block diagram of second embodiment of a control apparatus for controlling a position of an optical system of the present invention.

FIG. 5 shows a block diagram of second embodiment of the present invention.

In FIG. 5, 4 denotes a group of zoom lenses, 6 denotes a group of focus lenses, 7 and 9 denote first and second actuators moving respective groups of lenses 4 and 6, 10 and 12 denote first and second drive circuits which drive the first and second actuators 7 and 9 respectively, 1 and 3 denote first and second lens position detectors detecting positions of each of the sets of lenses 4 and 6, 5 denotes a diaphragm, 8 denotes a third actuator driving the diaphragm 5, 11 denotes a third driving circuit driving the third actuator 8, 2 denotes a position detector detecting an opening of the diaphragm 5, 13 denotes an imaging device positioned on an optical axis common to the groups of the lenses 4 and 6 and the diaphragm 5, and 14 denotes an image signal processing circuit outputting an image signal. Numeral 21 denotes an attitude variation compensator for revising a compensated value to be outputted from a correction device 19.

A target position calculating device 16 assigns target positions of the group of zoom lenses 4 and the group of focus lenses 6 utilizing the image signal outputted by the image signal processing circuit 14 or utilizing a focus distance information generated as a result of operator's manipulation of the group of zoom lenses 4 and/or the group of focus lenses 6. The positioning of the group of zoom lenses 4 and the group of focus lenses 6 is determined by a position control device 17, and operating conditions of the position control device 17 is checked by a evaluation device 18. According to an attitude of a video camera, the correction device 19 outputs a correcting value to be given to the position control device 17 for compensating the effect of the attitude of the video camera, and the result is outputted therefrom. A memory device 20 holds correction values for correcting output variations of each of the first and second actuators 7 and 9. In response to outputs of the first and second lens position detectors 1 and 3, an attitude variation compensator 21 reads out the correction values from the memory device 20 depending on the outputs of the first and second lens position detectors 1 and 3 and compensates the output of the correction device 19 according to the read out correction values.

Figure 10:
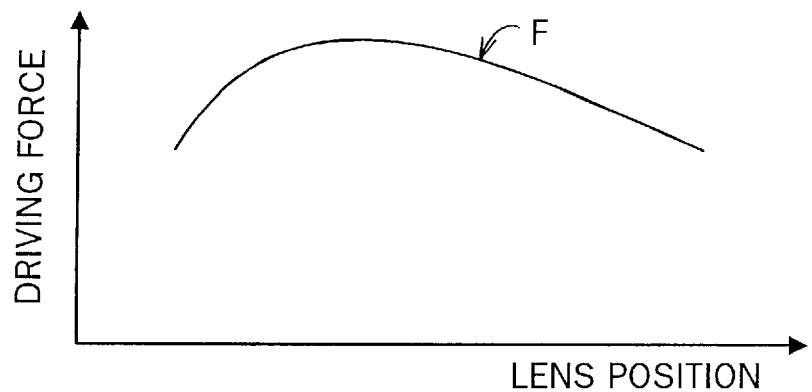
FIG. 10 shows an exemplary driving force of a voice coil motor, which is dependent on a position of the group of lenses.

Driving force of voice coil motor is generally not uniform over its driving range as shown FIG. 10. This non-uniformity of driving force is caused by the limitation of mechanical size and structure of the voice coil motor.

In FIG. 10, an exemplary non-uniform characteristic of driving force of the voice coil motor is shown. A symbol F denotes the driving force of the voice coil motor in relation to the position of the group of lenses. In the case that this non-uniformity is large, the control action of the group of lenses will become unstable when a predetermined amount of correction signal is outputted from the correction device 19 because the given correction amount may be too large or too small, as the actually generated driving force responsive to the given correction amount varies depending on the present position of the group of lenses.

Figure 11:
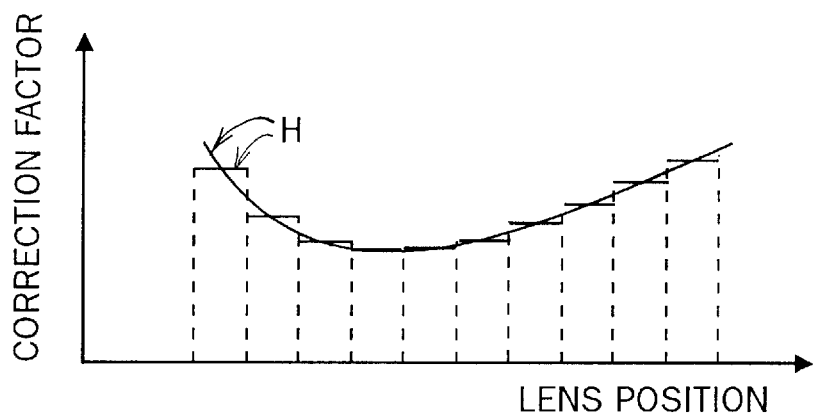
FIG. 11 shows an example of correction values which vary, depending on the position of group of lenses.

The above mentioned drawback can be improved by introducing a correction factor H into the control system as shown in FIG. 11. A uniform driving force can be derived by multiplying the correction amount to be given to the voice coil motor by the correction factor H, so that a resultant driving force actually generated becomes constant irrespective of the present position of the lens group. Such correction factors may be stored in a memory device as a table by dividing the moving range of the groups of lenses into a plurality of correcting zones.

Figure 12:
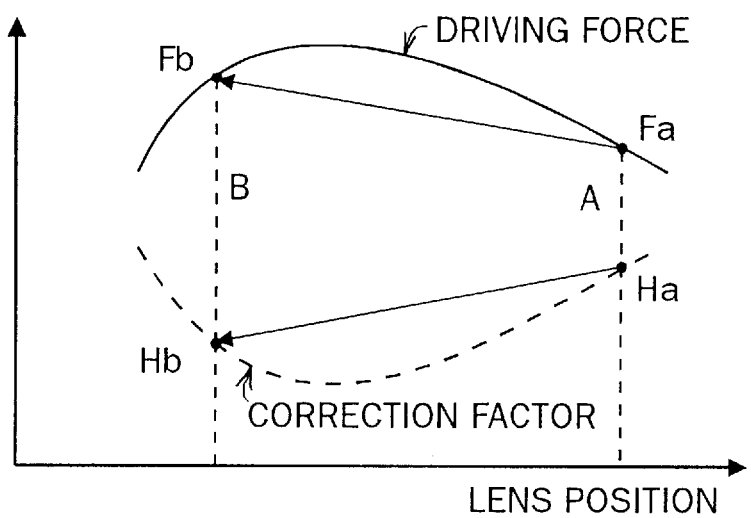
FIG. 12 shows a correction scheme using a correction values.

FIG. 12 shows how the variation of driving force related the position of set of lenses, is compensated. When the group of lenses moves from a point A to a point B, an equation Eq (3) or Eq (4) holds as the correction factor H is defined as explained before.

$$FaHa = FbHb \quad (3)$$

$$Fa = \frac{Hb}{Ha} Fb \quad (4)$$

In Eq (3) and Eq (4), Fa denotes the driving force at the position A, Ha denotes the correction factor at the position A, Fb denotes the driving force at the position B, Hb denotes the correction factor at the position B.

From Eq (3) or Eq (4), Fb is required to be Hb/Ha times Fa. By applying such a compensation as this, the driving force for the group of lenses is kept constant, and a stable control of the group of lenses is provided.

The above mentioned control system may be realized by a computer with software constituting the control signal producing circuit 15 operated as follows.

Figure 14:
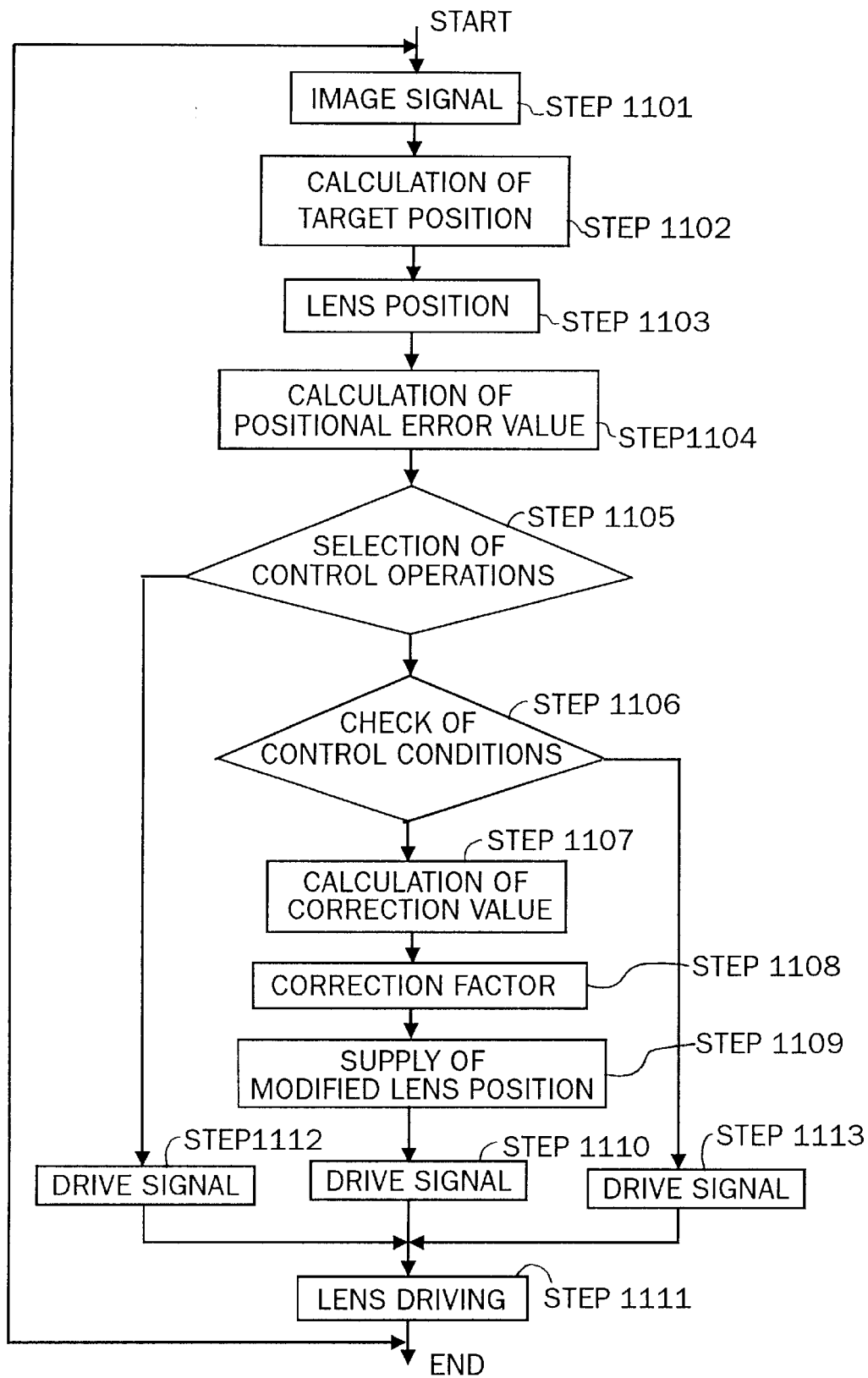
FIG. 14 shows a flowchart of a software which may be used in the second embodiment of the control apparatus for controlling a position of the optical system of the present invention.

A flowchart of the software will be explained referring to FIG. 14.

In Step 1101, the control signal producing circuit 15 receives the image signal from the image signal processing circuit 14.

In Step 1102, the control signal producing circuit 15 calculates and assigns respective target positions for the group of zoom lenses 4 and the group of focus lenses 6.

In Step 1103, the first lens position detector 1 detects the position of the group of zoom lenses 4, and the second position detector 3 detects the position of the group of focus lenses 6.

In Step 1104, the control signal producing circuit 15 calculates respective positional error values of the group of zoom lenses 4 and the group of focus lenses 6 by subtracting the detected results from the values of target positions respectively.

In Step 1105, the control signal producing circuit 15 selects control operations according to the magnitude of the positional errors, such as proportional plus derivative (PD) control operation for a large error, proportional plus integral plus derivative (PID) control operation for a small positional error.

In Step 1106, the control signal producing circuit 15 checks the control conditions under which lens positions are controlled before the revision made in Step 1105.

In Step 1107, the control signal producing circuit 15 calculates a correcting value for compensating an effect of the attitude of the video camera.

In Step 1108, the memory device 20 of the control signal producing circuit 15 outputs a correction factor referring to the correcting value derived in Step 1107.

In Step 1109, the control signal producing circuit 15 supplies modified lens positions.

In response to the actions taken at the preceding steps 1105 to 1109, the following steps are respectively taken.

In Step 1112, the control signal producing circuit 15 calculates and supplies drive signals to the driving circuits 10 and 12.

In Step 1113, the control signal producing circuit 15 calculates and supplies drive signals to the driving circuits 10 and 12.

In Step 1110, the control signal producing circuit 15 calculates and supplies drive signals to the driving circuit 10 and 12.

In Step 1111, the groups of lenses 4, 6 are driven respectively by signals outputted by the control signal producing system 15.

According to the embodiments of the present invention, it is disclosed that the control apparatus for controlling an optical system of the present invention has an advantage of stable control of a group of lenses in any attitude of the video camera by applying correction factors to the driving force for moving the group of lenses.

What is claimed is:

1. A control apparatus for providing positional control of an optical system for a video camera which generates video signals with each video signal having a video field, comprising:

a group of zoom lenses for zooming in on an object, a group of focus lenses for focusing on the object, position detecting means for detecting present positions of said group of zoom lenses and said group of focus lenses respectively, target position calculating means for calculating target positions of said group of zoom lenses and said group of focus lenses respectively for each video field with the period of each video field having a moving state and a tracking state for said group of zoom lenses and focus lenses respectively, driving means for driving said group of zoom lenses and said group of focus lenses, control means for controlling said driving means in response to said target position calculating means to position said group of zoom lenses and said group of focus lenses respectively to said target position in each video field, evaluation means for evaluating the target positions established by said target position calculating means in the video field for the video period immediately preceding movement of the lenses to the new target positions in a subsequent video field to determine if the target positions in the preceding video period are in the tracking state for each group of lenses and if residual deviations therefrom lie within predetermined values respectively and with said evaluation means evaluating the effect of gravity on said optical system in each video field period, and correction means for calculating correcting values for canceling errors for target position calculations from the effect of gravity, said correcting values to be provided to said control means in response to an output from said position detecting means, and an output from said evaluation means and an output from said control means to said correction means.

2. A control apparatus in accordance with claim 1, further comprising:

memory means for memorizing a correction factor which is applied to said correction means for canceling non-uniformity of said driving means, and modifying means for modifying an output of said correction means by using said correction factor.

3. A control apparatus in accordance with claim 1, wherein said control means comprises a control network having a derivative and proportional control function and an integral compensating function, said control network operating selectively so that upon a driving of said driving means, an output result of said derivative and proportional control function is added to another output result of said integral compensating function, said another output result being produced immediately before said group of zoom lenses and said group of focus lenses start moving toward said target positions.

4. A control apparatus in accordance with claim 2, wherein said control means comprises a control network having a derivative and a proportional control function and an integral compensating function, said control network operating selectively so that upon a driving of said driving means, an output result of said derivative and proportional control function is added to another output result of said integral compensating function, said another output result is produced immediately before said group of zoom lenses and said group of focus lenses start moving to said target positions.

5. A control apparatus in accordance with claim 1, wherein said driving means for driving said group of zoom lenses and said group of focus lenses, comprises voice coil motors.

6. A control apparatus in accordance with claim 2, wherein said driving means for driving said group of zoom lenses and said group of focus lenses, comprises voice coil motors.

7. A control apparatus in accordance with claim 3, wherein said driving means for driving said group of zoom lenses and said group of focus lenses, comprises voice coil motors.

8. A control apparatus in accordance with claim 4, wherein said driving means for driving said group of zoom lenses and said group of focus lenses, comprises voice coil motors.

9. A control apparatus in accordance with claim 1, wherein said driving means for driving said group of focus lenses, comprises a voice coil motor.

10. A control apparatus in accordance with claim 2, wherein said driving means for driving said group of focus lenses, comprises a voice coil motor.

11. A control apparatus in accordance with claim 3, wherein said driving means for driving said group of focus lenses, comprises a voice coil motor.

12. A control apparatus in accordance with claim 4, wherein said driving means for driving said group of focus lenses, comprises a voice coil motor.

* * * * *